INVENTORS
HERMAN BLASBALG
RICHARD VAN BLERKOM
Ronald J. Kransdorf
AGENT

United States Patent Office 3,185,824
Patented May 25, 1965

3,185,824

ADAPTIVE DATA COMPACTOR

Herman Blasbalg, Baltimore, Md., and Richard Van Blerkom, Washington, D.C., assignors to International Business Machines Corporation, New York, N.Y., a corporation of New York Filed Oct. 24, 1961, Ser. No. 147,343
4 Claims. (Cl. 235—154)

The invention relates to data compactors and more particularly to a data compactor which is adapted to have its output code varied to achieve optimum compaction.

Successive frames of binary data derived from a plurality of time multiplexed sensors or other input sources generally contain large amounts of unwanted redundancy. When transmitting this data, it has been found that if some or all of these redundancies were eliminated by compacting the data, it would result in a number of advantages. Among these advantages are reductions in transmission time, bandwidth, power and/or error rate, and in storage requirements. If the compaction ratio (C) actually obtained is defined as the ratio of the average number of bits required to represent a message at the compactor input to the average number of bits for a message at the compactor output, then the transmission time (T) required for the same bandwidth can be reduced to $T/C$ or, alternatively, the bandwidth (W) can be reduced to $W/C$. Where weight is a factor, such as in missiles, satellites, and other space vehicles, data compaction, by reducing the power required to transmit the data, permits the use of lighter equipment. Since thermal noise is directly proportional to the bandwidth, the signal power (S) could be reduced to $S/C$ without increasing the signal-to-noise ($S/No$) ratio.

Another important advantage of data compaction is that it can be used to reduce the bit error rate. It has been shown that the probability of correctly identify a signal is exponentially proportional to the signal energy. But where time and bandwidth are left the same, the signal energy (S′) for the compacted data is equal to CS (where S is the signal energy for the same data in uncompacted form). Therefore, the probability of a correct decision will be exponentially proportional to C. Since the removal of some of the redundancy from the data makes each remaining bit more significant, it may be desirable for some applications to use some of the compaction to increase the signal energy and thus to obtain the desired reliability. The remainder of the compaction can be employed to reduce the time, bandwidth, or power required for transmission.

Finally, the compacted data will require a smaller memory to store it until it is needed. For example, in a space vehicle, where memory size and weight are important factors, data compaction would allow the use of a smaller, lighter memory if the data is to be stored.

The basic object of this invention is, therefore, to provide improved means for reducing the number of bits required to represent a given message.

Prior Art schemes for accomplishing this object have used information either known or estimated of the average statistics for the input data sequences to originally generate a fixed prediction function. This function is used to build a coder for compacting the input data in a given manner. For example, an estimate of subsequently occurring input data could be made by acting on the present data with the prediction function, and this estimated value compared with the actual value of the subsequently occurring data in a comparison circuit. The output from this comparison circuit could then be encoded in any suitable manner. One possible method of encoding is run length coding. With this coding scheme, a count is maintained of the number of successful comparisons and this count is applied to the circuit output line when an unsuccessful comparison occurs, indicating an incorrect estimate.

Compactors of the type mentioned above are of little use when the statistics of the input data are not known or are known only in a sketchy manner, so that an accurate prediction function cannot be generated. In this situation, a higher compaction ratio can be obtained by devising an adaptive compactor, the coder of which will vary as the input statistics vary. In the example mentioned above, the coder could be made adaptive by, for example, altering the prediction function in response to variations in the input data sequence or by altering the coding scheme used at the encoder, as for example, by switching from one encoding scheme to another.

A more specific object of this invention is, therefore, to provide an adaptive compactor the coder of which may be varied in response to variations in the input data sequence to select the coding action which will yield the least number of bits at the circuit output line.

Another object of this invention is to provide means for accomplishing the above object by varying the coding scheme used at the output encoder.

In accordance with these objects, this invention provides a coder capable of functioning with a predetermined number of different coding actions. The coder is positioned in the circuit between the source or sources of binary input data and the circuit output line. Means are provided for analyzing the statistics of the input data (as, for example, by detecting and counting the number of changes in the data from the input data sources between successive scannings, and variation in the statistics of the input data detected by the statistical analyzer are applied to a selecting means to select from the possible coding actions of said coder, the coding action which will yield the least number of bits at the circuit output line. A possible implementation for the above would include a first coding means (for example, a run length coder), a second coding means (for example, a direct transmission line), and a switching means for normally passing the input data through the first coding means and for passing the data through the second coding means in response to a predetermined variation in the statistics of the input data.

In one sample embodiment of the invention, circuit means are provided for comparing data bits in a given frame with bits predicted for this frame in a prediction function generator (for example, with the corresponding data bits in the preceding frame) on a bit by bit basis and for generating an output bit when the bits compared disagree. The results of this comparison are normally encoded in a particular manner as, for example, by stepping a RUN-LENGTH counter in synchronism with the comparisons in said circuit means. Under normal conditions, an output from the circuit means will cause: (*a*) a flag signal to appear on the circuit output line, (*b*) the contents of the RUN-LENGTH counter to follow the flag signal on the circuit output line, (*c*) the RUN-LENGTH counter to be reset. To make the compactor adaptive a variable encoder is used and, for example, a second counter is provided to count the number of outputs from the circuit means during each frame. If this number exceeds a predetermined value during a given frame, the counter will generate a signal which causes a flip-flop to be transferred to select a new encoding action by, for example, setting up gates to allow the outputs from the comparison circuit for the next frame to be passed directly (a special form of encoding) to the circuit output line.

The foregoing and other objects, features and advantages of the invention will be apparent from the following more particular description of preferred embodiments of the invention, as illustrated in the accompanying drawings.

Figure 1:
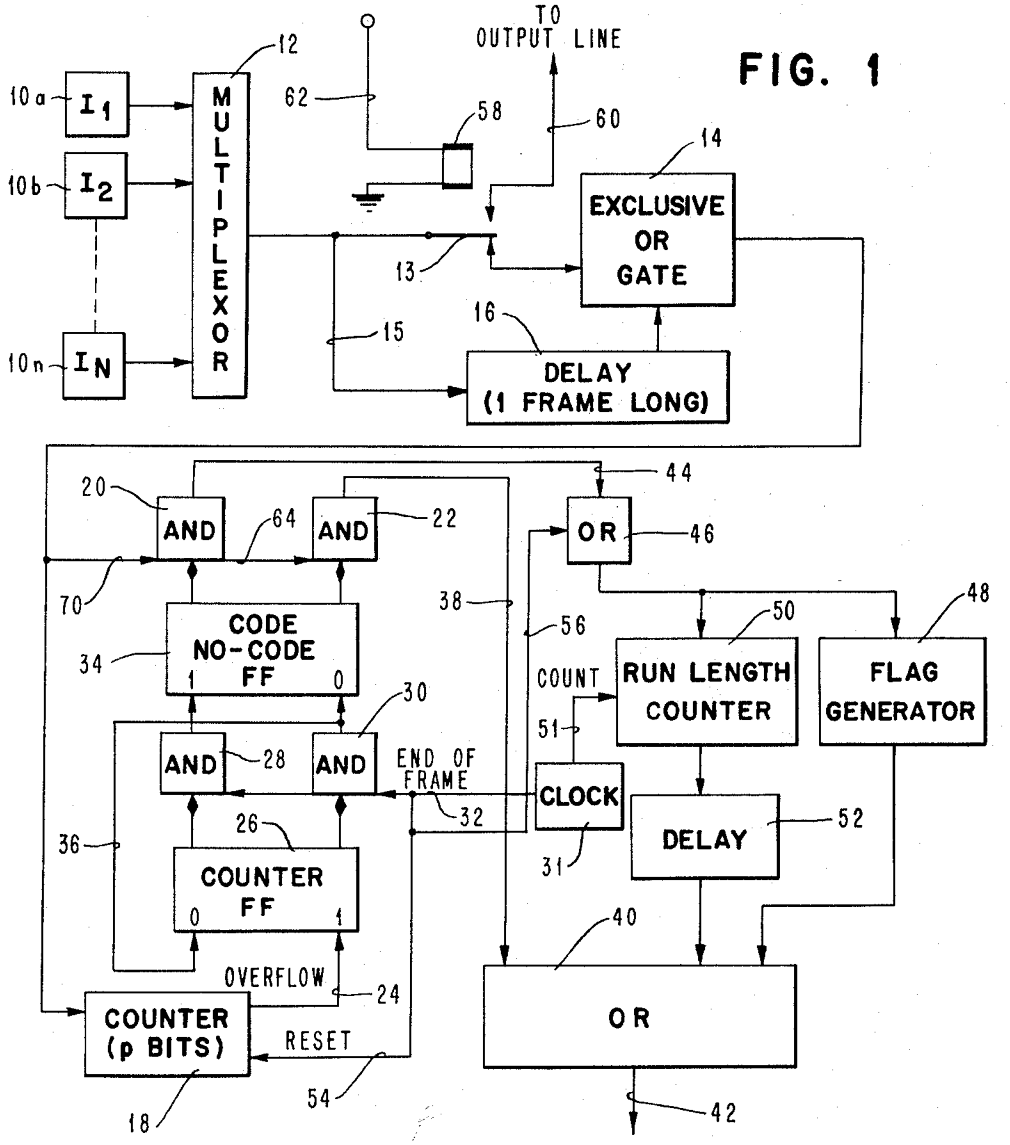
FIG. 1 is a block diagram of one embodiment of the adaptive data compactor of this invention.

Referring to FIG. 1 the boxes *10a–10n* represent sources of binary input data which are time scanned by the multiplexer 12. Each bit of the sequence of binary pulses out of the multiplexer 12 is applied simultaneously, through normally closed contact 13, to EXCLUSIVE OR gate 14 and to delay line 16, the output from the delay line being applied to the other input of the EXCLUSIVE OR gate. If the data from input sources *10a–10n* were analog rather than binary, an analog-to-digital converter would be inserted in the circuit between multiplexer 12 and the tap-off to line 15. The length of the delay line is equal to one frame, a frame being defined as the number of bits scanned by the multiplexer in one complete scan of the input data sources. The EXCLUSIVE OR gate accepts the two binary inputs applied to it and generates an output only when these two inputs disagree. This output is applied simultaneously to counter 18 and to AND gates 20 and 22. Counter 18 has a capacity of P bits, P being the number of bit-changes-per-frame which can occur without causing the run length coding scheme to give data expansion rather than data compaction. If the capacity of counter 18 is exceeded, a signal will appear on overflow line 24 causing COUNTER flip-flop 26 to be switched to its ONE state. The D.-C. output levels of the COUNTER flip-flop are applied to condition either AND gate 28 or AND gate 30 depending upon the state of the flip-flop. The AND gates 28 and 30 are simultaneously pulsed at the end of each frame by a signal from clock 31 applied to line 32. The outputs from AND gates 28 and 30 are applied to the ONE and ZERO input terminals, respectively, of CODE-NO-CODE flip-flop 34; the D.-C. level outputs from this flip-flop being applied to condition one or the other of the before-mentioned AND gates 20 or 22. The output from AND gate 30 is also applied through line 36 to the ZERO input terminal of the COUNTER flip-flop.

The output from AND gate 22 is applied directly through line 38 and OR gate 40 to the output line 42 of the compactor. The output line 42 may be connected, for example, to a transmitter or to some form of buffer storage device.

A RUN-LENGTH counter 50 is also provided, this counter being stepped by timing pulses from clock 31 applied to count line 51. The timing pulses are applied in synchronism with the comparisons in EXCLUSIVE OR gate 14 and the capacity of the counter is sufficient to count the number of such comparisons between two successive pulses applied to line 32 (in this circuit the number bits in one frame). The output from AND gate 20 is connected through a line 44 to OR gate 46. When a pulse passes through OR gate 46, it resets RUN-LENGTH counter 50 causing its contents to be passed through the delay line 52 and OR gate 40 to output line 42 and causes flag generator 48 to transmit a flag signal through OR gate 40 to output line 42. The flag signal which indicates the end of one run and the beginning of the next may be a single pulse having a shape that is different from any other bit; but this procedure is often undesirable, and, therefore, a more useful form for the flag signal might be a unique sequence of two or more bits. For example, the flag signal might consist of two ONE-bits where the code used to indicate the number contained in the RUN LENGTH counter is chosen so as not to contain this bit sequence. Since the output of OR gate 46 is applied simultaneously to both the flag generator and the RUN LENGTH counter, it is necessary that a delay be inserted between the RUN LENGTH counter and OR gate 40 so that the contents of the RUN LENGTH counter will follow the flag signal on output line 42. The length of delay 52 will depend on the number of bits used for the flag signal.

In addition to being applied to AND gates 28 and 30, the END-OF-FRAME signal applied to line 32 by clock 31 is also applied through line 54 to reset counter 18 and through line 56 and OR gate 46 to flag generator 48 and counter 50. A relay coil 58 is also provided which, when it is energized, transfers the contact 13 to cause the output from multiplexer 12 to flow directly through line 60 to the output line 42. The relay coil 58 is energized by control signals applied to control line 62.

For convenience in describing the operation of the beforedescribed circuit, it will be assumed that the input sources *10a–10n* are sensors in a space vehicle and that signals appearing on output line 42 are being fed to a transmitter to be transmitted to earth. It will be further assumed that a ONE bit will be represented by the presence of a signal on a line and a ZERO bit by the absence of a signal. During the first scan of the data sources *10a–10n*, a control signal either transmitted from earth or derived from some control source in the space vehicle is applied to control line 62 to cause contact 13 to be transferred. Therefore, the information derived from the first scan will be transmitted directly, in uncoded form, to earth where it may be stored and used as a frame of reference for the subsequently transmitted coded data.

For the second frame and for all subsequent frames (with an exception to be noted later) no control signal is applied to control line 62 and the contact 13 is in its normal position shown in FIG. 1. Since the line 15 leading to delay line 16 is between the multiplexor and contact 13, the results of the first scan are stored in the delay line. Therefore, during the second frame, the results of the second scan are being fed in EXCLUSIVE OR gate 14 through contact 13 simultaneously with the results of the first scan coming from delay line 16. Depending upon the number of sensors *10a–10n* which have changed between the first and the second scan and the amount of these changes, one of three possible sequences of operations will occur.

If there has been no change in any of the sensors *10a–10n* between the two scans, there will be no outputs from EXCLUSIVE OR gate 14 during frame 2, and at the end of this frame the END-OF-FRAME pulse coming in on line 32 will find counter 18 empty, RUN LENGTH counter 50 full, COUNTER flip-flop 26 in its ZERO state, and CODE-NO-CODE flip-flop 34 in its ONE state. This pulse would pass through conditioned AND gate 28 to attempt to switch CODE-NO-CODE flip-flop 34 to its ONE state, but, since this flip-flop is already in its ONE state, no switching action will occur. The END-OF-FRAME pulse will also attempt to reset counter 18 but, since nothing has been applied to this counter, it will not be changed. Finally, the END-OF-FRAME pulse will pass through line 56 and OR gate 46 to cause flag generator 48 to generate a flag signal on output line 42, and to reset RUN LENGTH counter 50, causing the contents of this counter to appear behind the flag signal on output line 42. A flag signal followed by a full frame count indicates to the receiver on earth that there has been no change in any of the space-vehicle sensors since the last scan. Greater data compaction might be obtained if, depending upon the statistics of the input, some special signal were available to indicate a frame in which there was no change in any sensor. There is a possibility that greater data compaction could also be obtained by using a fixed number of bits to represent the run length count no matter what this count happened to be, thereby eliminating the need for flag signals to indicate the end of one count and the beginning of the next. If the statistics of the inputs were such that the lengths of the counts were bunched about certain values, this scheme would probably give better compaction.

The second possible situation would be where there are only a few changes in the binary outputs of the sensors between the first and second frames. Here, when the first bit in which there is a change is compared with its previous value, a signal will appear at the output of EXCLUSIVE OR gate 14. This signal will find AND gate 20 conditioned and will pass through this gate and line 44 to OR gate 46. The resulting pulse out of OR gate 46 will energize flag generator 48 causing a signal to pass through OR gate 40 to output line 42 indicating that a change has occurred and will reset RUN LENGTH counter 50 causing the contents of this counter to pass through delay 52 and OR gate 40 to output line 42 indicating where in the frame the change has occurred. Since the same bit of the same sensor always occurs at the same place in each frame, by knowing in what bit of the frame the change has occurred, it is possible to determine which sensor has changed and by how much. The RUN LENGTH counter will then start counting again and will continue to count until either another signal comes out of the EXCLUSIVE OR gate or until the end of the frame, whichever comes first. Each signal out of EXCLUSIVE OR gate 14 steps counter 18 one position; but, since only a few changes occur in the frame, the capacity of counter 18 will not be exceeded, and COUNTER flip-flop 26 will remain in its ZERO condition. The END-OF-FRAME pulse will operate in exactly the same manner as described above with reference to a frame in which there was no change except that for this situation the counter 18 will be reset, and a smaller sum will be read out of the RUN LENGTH counter.

The third possible situation would occur where there is a large number of large changes in the readings of the various sensors between the two scans. Here, as for the previous case, each change will cause a signal to appear at the output of EXCLUSIVE OR gate 14 which signal will pass through conditioned AND gate 20 and line 44 to OR gate 46. Each output from OR gate 46 will cause a flag signal followed by a binary sequence representing the contents of RUN LENGTH counter 50 to appear on output line 42. Since many changes are occurring it is possible that for this frame there would actually be data expansion rather than data compaction.

Each output from EXCLUSIVE OR gate 14 will also be applied to counter 18 causing the contents of this counter to be increased by one. These frequent changes will cause the capacity of counter 18 to be exceeded resulting in an overflow pulse on line 24 which will transfer COUNTER flip-flop 26 to its ONE state. At the end of the frame, the END-OF-FRAME pulse on line 32 will find AND gate 30 conditioned and will pass through this gate to the ZERO input of CODE-NO-CODE flip-flop 34 switching this flip-flop to its ZERO or NO-CODE state. The END-OF-FRAME pulse will also pass through line 36 to reset COUNTER flip-flop 26 to its ZERO state. As usual, the END-OF-FRAME pulse will reset counters 18 and 50 and cause a flag signal and the contents of the RUN LENGTH counter to appear on line 42.

For the next frame, AND gate 22 will be conditioned, and any output signal from EXCLUSIVE OR gate 14 will pass directly through AND gate 22, line 38 and OR gate 40 to output line 42. In other words, where an excessive number of changes appear in a given frame, the circuit will shift from the run length coding mode to the direct transmission mode, the output from EXCLUSIVE OR gate 14 for the following frame being conveyed directly through output line 42 to the transmitter.

It is necessary that the ground station know when the compactor has switched to direct transmission. This may be accomplished by having the compactor send out some sort of signal when it switches to direct transmission; but, more simply, it may be accomplished by having a counter similar to counter 18 on the ground which counter will count the number of ONES transmitted during a frame and which counter will overflow to indicate a switch to direct transmission for the following frame when an excessive number of ONES is received. Some means must also be provided for properly positioning the directly transmitted ONE-bits in the data sequence. One possible way of accomplishing this would be to transmit on a real-time basis and have synchronization equipment on the ground.

During the frame of direct transmission the ONE bits out of EXCLUSIVE OR gate 14 are still being added into counter 18. At the end of the preceding frame the COUNTER flip-flop 26 was restored to its ZERO state by the END-OF-FRAME pulse passing through AND gate 30. This flip-flop will be in its ZERO state at the end of the directly transmitted frame unless an excessive number of ONES appear in this frame too, in which case the COUNTER flip-flop will again be switched to its ONE state. The END-OF-FRAME pulse on line 32 will then sample the AND gates 28 and 30 to determine whether the compactor will be operating in its direct-transmission or run length coding mode or the next succeeding frame in a manner already described above.

In the embodiment of the invention shown in FIG. 1 it is the output of EXCLUSIVE OR gate 14 which is transmitted directly when the compactor is operating in its direct transmission mode. It is, however, possible, and in fact preferable, that the output of multiplexor 12 rather than of EXCLUSIVE OR gate 14 be transmitted directly when the compactor is operating in that mode. This can be accomplished very simply by eliminating the connection 64 between EXCLUSIVE OR gate 14 and AND gate 22 and connecting AND gate 22 directly to the output of the multiplexor just after contact 13. This mode of operation has the advantage of updating the data stored on the ground at random intervals and thus reducing the possibility of propagating an error from a previous erroneous transmission. Even with this mode of operation it would probably be desirable to periodically update the data stored on the ground so as to further reduce the possibility of an error being propagated. This periodic updating would be accomplished by applying a control signal to control line 62 to transfer contact 13 after a predetermined number of frames of compacted transmission.

Figure 2:
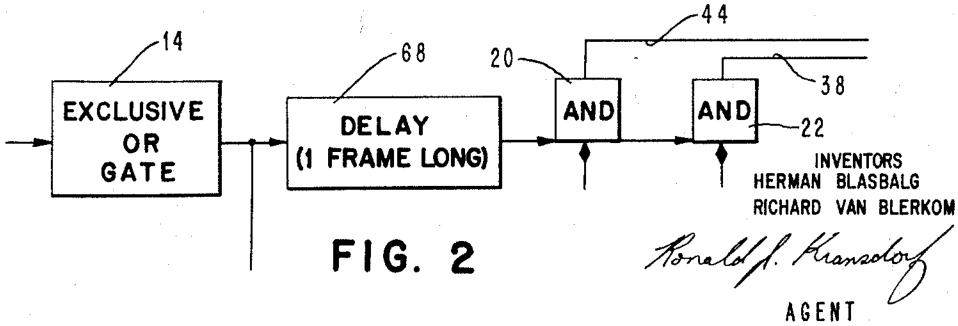
FIG. 2 is a partial block diagram of an alternative embodiment of the invention.

One problem mentioned in describing the embodiment of FIG. 1 was that, for the frame in which the excessive number of changes has occurred, there might actually be data expansion rather than data compaction and that it was not until the following frame that the circuit switched to direct transmission. While the sensors are probably being sampled at something greater than twice the maximum change frequency which is likely to be encountered and since their statistics are relatively stationary, this method of coding is relatively efficient; however, an increase in efficiency can be obtained by modifying the embodiment of FIG. 1 as shown in FIG. 2. This modification involves the addition of a one-frame delay line 68 at the point 70 of FIG. 1. With this embodiment of the invention, the output from EXCLUSIVE OR gate 14 will be applied simultaneously to counter 18 and delay line 68. At the end of the frame the results of the count in counter 18 will cause the CODE-NO-CODE flip-flop 34 to condition the appropriate AND gate 20 or 22 to pass the outputs from delay line 68 which are now being applied to them. Since the delay 68 is one frame long, the data being passed by the AND gates 20 or 22 is the same data as caused them to be conditioned, and any possibility of data expansion using this circuit is eliminated. With this embodiment of the invention, the earth-based equipment would be informed of the change in the method of transmission by, for example, connecting the output of AND gate 30 to OR gate 46.

In the embodiments of the invention described so far, a pulse has been applied to line 32 at the end of each frame. It is possible that, depending on the number of input sources, greater data compaction will be obtained by applying more than one of these pulses to a frame or by applying one of these pulses only after two or more frames have passed.

In the figures, blocks have been used to represent the various circuits and it is to be here understood that the particular circuits used in the blocks are not considered to be part of this invention and that any suitable circuits may be employed. It should also be noted that any shifting or shiftable storage device, such as a shift register, may be substituted for the delay lines 16 and 68. The only limitation on the storage device used is that it be capable of shifting at a constant frequency.

While the invention has been particularly shown and described with reference to preferred embodiments thereof, it will be understood by those skilled in the art that the foregoing and other changes in form and details may be made therein without departing from the spirit and scope of the invention.

We claim:

1. An adaptive circuit for reducing the number of binary bits required at the circuit output line to represent a frame of binary data from one or more input sources, comprising in combination:

circuit means for comparing data bits in a given frame with the corresponding data bits in the preceding frame on a bit by bit basis and for generating an output bit when the bits compared disagree;

means for counting the number of comparisons between each output bit from said circuit means;

first gating means normally responsive to an output from said circuit means for causing the contents of said counting means to be presented to the circuit output line;

and means including second gating means responsive to an excessive number of changes in said input sources for disabling said first gating means and causing subsequently occurring bits to pass directly to the circuit output line.

2. An adaptive circuit for reducing the number of binary bits required at the circuit output line to represent a frame of binary data from one or more input sources comprising in combination:

circuit means for comparing data bits in a given frame with the corresponding data bits in the preceding frame on a bit by bit basis and for generating an output bit when the bits compared disagree;

means for counting the number of comparisons between each output from said circuit means;

first gating means normally responsive to an output from said circuit means for causing the contents of said counting means to be presented to the circuit output line;

and means including second gating means responsive to an excessive number of changes in said input sources for disabling said first gating means and causing subsequently occurring outputs from said circuit means to pass directly to the circuit output line.

3. An adaptive circuit for reducing the number of binary bits required at the circuit output line to represent a frame of binary data from one or more input sources comprising in combination:

circuit means for comparing data bits in a given frame with the corresponding data bits in the preceding frame on a bit by bit basis and for generating an output bit when the bits compared disagree;

means for counting the number of comparisons between each output from said circuit means;

first gating means normally responsive to an output from said circuit means for causing the contents of said counting means to be presented to the circuit output line;

and means including second gating means responsive to an excessive number of changes in said input sources for disabling said first gating means and causing subsequently occurring data from said input sources to pass directly to said circuit output line.

4. An adaptive circuit for reducing the amount of binary bits required at a circuit output line to represent a sequence of binary data from an input source comprising in combination:

a comparison circuit having two inputs and an output;

a delay circuit for delaying each binary bit sequence applied to it a predetermined amount;

means for applying each bit of the binary data simultaneously to one input of said comparison circuit and to said delay circuit;

means for applying the output of said delay circuit to the other input of said comparison circuit;

variable encoder means, having an input connected to the output of said comparison circuit and an output connected to the circuit output line, for encoding the output from said comparison circuit;

means responsive to the input source for analyzing the statistics of the input data and for generating an output in response to predetermined variations therein; and means responsive to the output of said analyzing means for selecting from the possible coding actions of said variable encoder, the coding action which will yield the least number of bits at the circuit output line.

References Cited by the Examiner

UNITED STATES PATENTS 3,036,775 5/62 McDermid et al. ------- 235—165

References Cited by the Applicant

UNITED STATES PATENTS 2,905,756 9/59 Graham.

MALCOLM A. MORRISON, *Primary Examiner.*

DARYL W. COOK, *Examiner.*